Sept. 12, 1967  M. E. GARRETT  3,341,173
APPARATUS EMPLOYING GAS BEARINGS
Filed Feb. 25, 1966
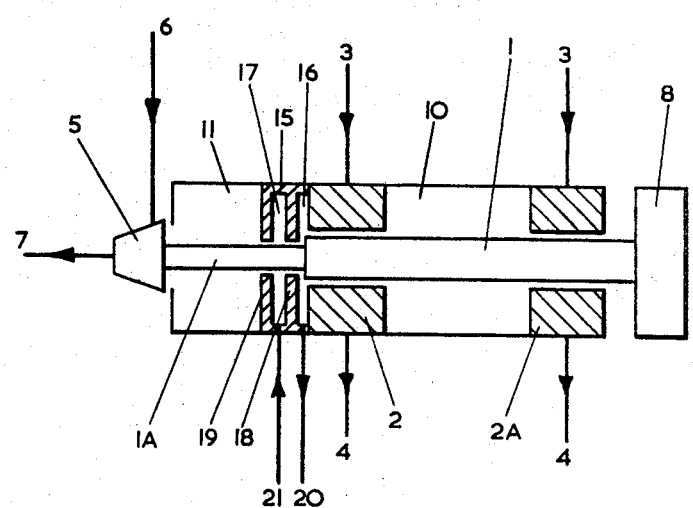
INVENTOR
MICHAEL ERNEST GARRETT
BY
ATTORNEYS

United States Patent Office 3,341,173
Patented Sept. 12, 1967

3,341,173
APPARATUS EMPLOYING GAS BEARINGS
Michael E. Garrett, Addlestone, Surrey, England, assignor to The British Oxygen Company Limited, a British company
Filed Feb. 25, 1966, Ser. No. 530,144
Claims priority, application Great Britain, Mar. 4, 1965, 9,328/65
2 Claims. (Cl. 253—39)

This invention relates to apparatus employing gas bearings, and in particular to small high speed expansion turbines having hydrostatic journal gas bearings.

In a hydrostatic journal gas bearing, lubricating gas is fed at high pressure to the bearing, and expands within the bearing before being discharged through exhaust holes or passages in the bearing. In normal operation a small proportion of this lubricating gas escapes from the ends of the bearing; this is termed the bearing end flow. The bearing end flow is dependent on the external pressure at the bearing ends, and if the external pressure is raised to a certain level, namely the bearing end flow pressure, the bearing end flow becomes nil. Although the bearing operates satisfactorily with no bearing end flow, if the external pressure is increased still further to a level referred to as the limiting end pressure, bearing failure results. Consequently there is a need to regulate the external pressure at the bearing ends both to avoid bearing failure, and also to limit the wastage of lubricating gas which results from high bearing end flow.

The problem of regulating the bearing end flow becomes more complicated when the bearing is part of a high speed expansion turbine incorporated in a refrigerator circuit. In such turbines, a small diameter turbine rotor is mounted on one end of a shaft supported in hydrostatic journal gas bearings, and the other end of the the shaft carries a brake for dissipating the energy developed by the turbine; such a brake is commonly in the form of a compressor rotor. The turbine rotor is supplied with cold compressed gas which is further cooled by its expansion in the turbine, and the gas bearings are conveniently supplied with gas from the same main compressor which supplies the turbine gas. The bearing gas is generally at ambient temperature, since cooling this gas would need additional cold supply. In this case, any interchange of the bearing gas with the cold turbine gas resulting from leakage therebetween would result in loss of cold due either to warming of the turbine exhaust or to loss from the cold gas stream, and such leakage must therefore be minimized. The leakage flow will depend on the relationship between the pressure of the cold gas on the bearing side of the turbine (referred to as the turbine tip pressure) and the bearing end flow pressure.

It will be seen therefore that control of bearing end flow is essential both to satisfactory bearing operation and to minimizing cold loss. The difficulties of this control depend on the particular conditions of pressure in any case. For example, at low turbine throughputs the turbine tip pressure may be below the limiting end pressure of the bearing, and in this case cold loss could be minimized by withdrawing gas from a chamber between the turbine rotor and the bearing at a pressure regulated to equal the turbine tip pressure. At normal turbine throughputs however the tip pressure will exceed the limiting end pressure, and consequently if such a chamber were maintained at the turbine tip pressure bearing failure would result. Such a result could be counteracted by increasing the gas bearing supply pressure, but this would require compression additional to that provided by the main compressor as well as increased gas consumption in the bearing.

The present invention provides means whereby the bearing end flow may be appropriately regulated even when the turbine tip pressure is higher than the limiting end pressure of the bearing. This invention may also be used in other cases in which it is desired to regulate gas bearing end flow while at the same time minimizing the mixng of bearing gas with that in a chamber adjacent to the gas bearing.

According to one aspect of the present invention there is provided apparatus comprising a rotatable shaft supported in a gas bearing, said shaft projecting beyond said bearing into a chamber subject to variations in pressure which may exceed or fall below the limiting end pressure of the bearing, and guard means interposed between said chamber and said bearing, said guard means comprising two pockets surrounding the shaft in axially spaced relationship, a first means being provided for maintaining in the pocket proximate to the bearing a gas pressure not exceeding the limiting end pressure of the bearing, and a second means being provided for maintaining in the pocket proximate to the chamber a pressure substantially equal to that in the chamber.

According to another aspect of the present invention there is provided a high speed expansion turbine having a rotor mounted on a rotatable shaft supported in a gas bearing, a chamber interposed between the rotor and the bearing, and guard means adjacent to said bearing, said guard means comprising two pockets surrounding the shaft in axially spaced relationship, a first means being provided for maintaining in the pocket proximate to the bearing a gas pressure not exceeding the limiting end pressure of the bearing and a second means being provided for maintaining in the pocket proximate to the chamber a pressure substantially equal to that in the chamber.

In a high speed expansion turbine of the type described, the chamber would be disposed between the gas bearing and the turbine rotor; the term chamber includes any part between the bearing and the turbine rotor which is at substantially turbine tip pressure. Other arrangements may be contemplated; for example, if it were preferred to use cold gas for the bearings, the problem would then be to prevent interchange between this gas and that surrounding the brake, and consequently the chamber would instead be adjacent to the brake. Under certain conditions it might be necessary to regulate the bearing end flow at both ends of the bearing in the same way.

In a particular form of the invention, the two annular pockets are provided in a guard ring attached to, and concentric with, the end of the bearing, the pockets each having a radical conduit connected to a pressure regulating device. Where the turbine tip pressure is P1, and the limiting end pressure of the bearing is P2 (lower than P1), the pocket on the turbine side would be supplied with gas (at ambient temperature) at P1, and gas would be bled from the pocket on the bearing side at a pressure regulated at slightly below P2.

The invention will be particularly described with reference to the accompanying drawing which shows diagrammatically a small high speed expansion turbine for use in a refrigeration circuit.

A shaft 1 is journalled in two hydrostatic gas bearings 2 and 2A which are supplied via conduits 3 with gas at ambient temperature at a pressure of 150 pounds per square inch from a main compressor. Gas is exhausted from radial holes in the bearings via conduits 4. One end of the shaft 1A is of reduced diameter, and carries a small diameter turbine rotor 5, designed to be revolved at high speed by cold compressed gas at 150 pounds per square inch which enters at 6 and is then expanded and exhausted at 7. At the other end of shaft 1 is mounted a brake in the form of a compressor rotor 8, which circulates gas in a closed circuit (not shown) having a heat exchanger for dissipating the energy provided by the expanding gas.

The gas supplied to the bearings largely escapes through the conduits 4 at approximately ambient pressure, but a certain amount also escapes as bearing end flow. Since the compressor lies in a closed circuit the gas escaping into this circuit eventually builds up the pressure to the bearing end flow pressure, and the bearing end flow at this end ceases. The same pressure build-up occurs in the closed space 10 between the two gas bearings.

The cold compressed gas entering the turbine at 150 pounds per square inch causes a region of moderately high pressure to develop in the chamber 11 behind the turbine rotor; the pressure in this region is the turbine tip pressure of about 100 pounds per square inch. The limiting end pressure of the bearing, as supplied with gas at 150 pounds per square inch, is about 60 pounds per square inch, and consequently if the bearing end were not protected from the turbine tip pressure the bearing would fail. To give this protection, and also to minimize mixing of the bearing gas with the turbine gas and attendant cold loss, a guard ring 15 is provided at the end of the bearing 2, between this bearing and the chamber 11. The guard ring 15 provides two annular pockets 16 and 17, bounded by the bearing face and two lands 18 and 19 providing a small clearance around the reduced diameter portion of the shaft 1A. The pockets 16 and 17 are connected to gas lines 20 and 21 respectively, and these lines are provided with gas supply means and pressure regulators not shown.

In operation, the pocket 17 is supplied via line 21 with gas at the turbine tip pressure of 100 pounds per square inch at ambient temperature. This prevents any substantial flow of turbine gas into or out of the chamber 11 and guards against cold loss. At the same time gas is bled from the pocket 16 via line 20 at a pressure of about 55 pounds per square inch this being sufficiently high to minimize leakage from the groove 17, but somewhat below the limiting end pressure of the bearing so that the bearing is protected against falure.

The device may be controlled either by matching the pressures in chamber 11 and pocket 17 and adjusting the bleed off from pocket 16, or by using flow measuring devices to ensure that the quantity of gas passing into the bearings through conduits 3 and 21 is equal to that exhausting through conduits 4 and 20, at the same time ensuring that the pressure in pocket 16 is lower than the limiting end pressure. Such controls may be automatic, or may be preset for particular conditions.

Although in this particular turbine the guard ring 15 is located over a shaft end which is of reduced diameter, it is equally possible for the shaft end not to be reduced.

I claim:
1. Apparatus comprising a gas bearing, a chamber subject to variations in pressure which may differ from the limiting end pressure of the bearing, a rotatable shaft which is supported in said gas bearing and projects beyond said bearing into said chamber, and guard means interposed between said chamber and said bearing, said guard means comprising two pockets surrounding the shaft in axially spaced relationship, a first means being provided for maintaining in the pocket proximate to the bearing a gas pressure not exceeding the limiting end pressure of the bearing, and a second means being provided for maintaining in the pocket proximate to the chamber a pressure substantially equal to that in the chamber.

2. A high speed expansion turbine comprising a gas bearing, a rotatable shaft supported in said gas bearing, a rotor mounted on the shaft, a chamber interposed between the rotor and the bearing, and guard means adjacent to said bearing, said guard means comprising two pockets surrounding the shaft in axially spaced relationship; a first means being provided for maintaining in the pocket proximate to the bearing a gas pressure not exceeding the limiting end pressure of the bearing, and a second means being provided for maintaining in the pocket proximate to the chamber a pressure substantially equal to that in the chamber.

References Cited
UNITED STATES PATENTS

| | | | |
|---|---|---|---|
| 2,910,328 | 10/1959 | Frolich | 308—36.3 |
| 3,038,318 | 6/1962 | Hanny | 230—116 |
| 3,105,631 | 10/1963 | Hanny | 230—116 |
| 3,128,133 | 4/1964 | Audemar | 308—36.3 |

CARLTON R. CROYLE, *Primary Examiner.*